(12) United States Patent
Curd et al.

(10) Patent No.: US 6,907,595 B2
(45) Date of Patent: Jun. 14, 2005

(54) PARTIAL RECONFIGURATION OF A PROGRAMMABLE LOGIC DEVICE USING AN ON-CHIP PROCESSOR

(75) Inventors: Derek R. Curd, Woodside, CA (US); Punit S. Kalra, Superior, CO (US); Richard J. LeBlanc, Longmont, CO (US); Vincent P. Eck, Loveland, CO (US); Stephen W. Trynosky, Boulder, CO (US); Jeffrey V. Lindholm, Longmont, CO (US); Trevor J. Bauer, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 12 days.

(21) Appl. No.: 10/319,051

(22) Filed: Dec. 13, 2002

(65) Prior Publication Data

US 2004/0113655 A1 Jun. 17, 2004

(51) Int. Cl.[7] ............................................... G06F 17/50
(52) U.S. Cl. .............................. 716/16; 716/17; 716/18; 326/39; 326/41
(58) Field of Search ................................. 716/1–2, 7–8, 716/12, 16–18, 20; 326/40, 41, 38

(56) References Cited

U.S. PATENT DOCUMENTS

| | | | | |
|---|---|---|---|---|
| 6,078,735 A | * | 6/2000 | Baxter ........................... | 716/3 |
| 6,096,091 A | | 8/2000 | Hartmann | |
| 6,128,770 A | * | 10/2000 | Agrawal et al. ............... | 716/17 |
| 6,304,101 B1 | * | 10/2001 | Nishihara ...................... | 326/41 |
| 6,429,682 B1 | * | 8/2002 | Schultz et al. ................ | 326/41 |
| 6,493,862 B1 | | 12/2002 | Young et al. | |
| 6,526,557 B1 | * | 2/2003 | Young et al. .................. | 716/16 |
| 6,629,311 B1 | * | 9/2003 | Turner et al. .................. | 716/17 |

OTHER PUBLICATIONS

*Virtex–II Pro, Platform FPGA Handbook*, Oct. 14, 2002, pp. 1–589, (v2.0), Xilinx, Inc., 2100 Logic Drive, San Jose, CA 95124.

"Advance Product Specification," *Virtex–II Pro™ Platform FPGA Documentation*, (Mar. 2002 Release), pp. 1–342, Xilinx, Inc., 2100 Logic Drive, San Jose, CA 95124.

"PPC 405 User Manual," *Virtex–II Pro™ Platform FPGA Documentation*, (Mar. 2002 Release), pp. 343–870, Xilinx, Inc., 2100 Logic Drive, San Jose, CA 95124.

"PPC 405 Processor Block Manual" *Virtex–II Pro™ Platform FPGA Documentation*, (Mar. 2002 Release), pp. 871–1058, Xilnix, Inc., 2100 Logic Drive, San Jose, CA 95124.

Rocket I/O Transceiver User Guide *Virtex–II Pro™ Platform FPGA Documentation*, (Mar. 2002 Release), pp. 1059–1150, Xilinx, Inc., 2100 Logic Drive, San Jose, CA 95124.

\* cited by examiner

*Primary Examiner*—Vuthe Siek
*Assistant Examiner*—Binh Tat
(74) *Attorney, Agent, or Firm*—E. Eric Hoffman; B. Hoffman (57) ABSTRACT

A programmable logic device, such as a field programmable gate array, is partially reconfigured using a read-modify-write scheme that is controlled by a processor. The partial reconfiguration includes (1) loading a base set of configuration data values into a configuration memory array of the programmable logic device, thereby configuring the programmable logic device; (2) reading a first frame of configuration data values from the configuration memory array; (3) modifying a subset of the configuration data values in the first frame of configuration data values, thereby creating a first modified frame of configuration data values; and (4) overwriting the first frame of configuration data values in the configuration memory array with the first modified frame of configuration data values, thereby partially reconfiguring the programmable logic device. The steps of reading, modifying and overwriting are performed under the control of a processor.

19 Claims, 5 Drawing Sheets

PARTIAL RECONFIGURATION OF A PROGRAMMABLE LOGIC DEVICE USING AN ON-CHIP PROCESSOR

FIELD OF THE INVENTION

The present invention relates to partial reconfiguration of a programmable logic device, such as a field programmable gate array (FPGA). More specifically, the present invention relates to the partial reconfiguration of a programmable logic device using an on-chip processor to perform a read-modify-write flow to the configuration data.

RELATED ART

Figure 1:
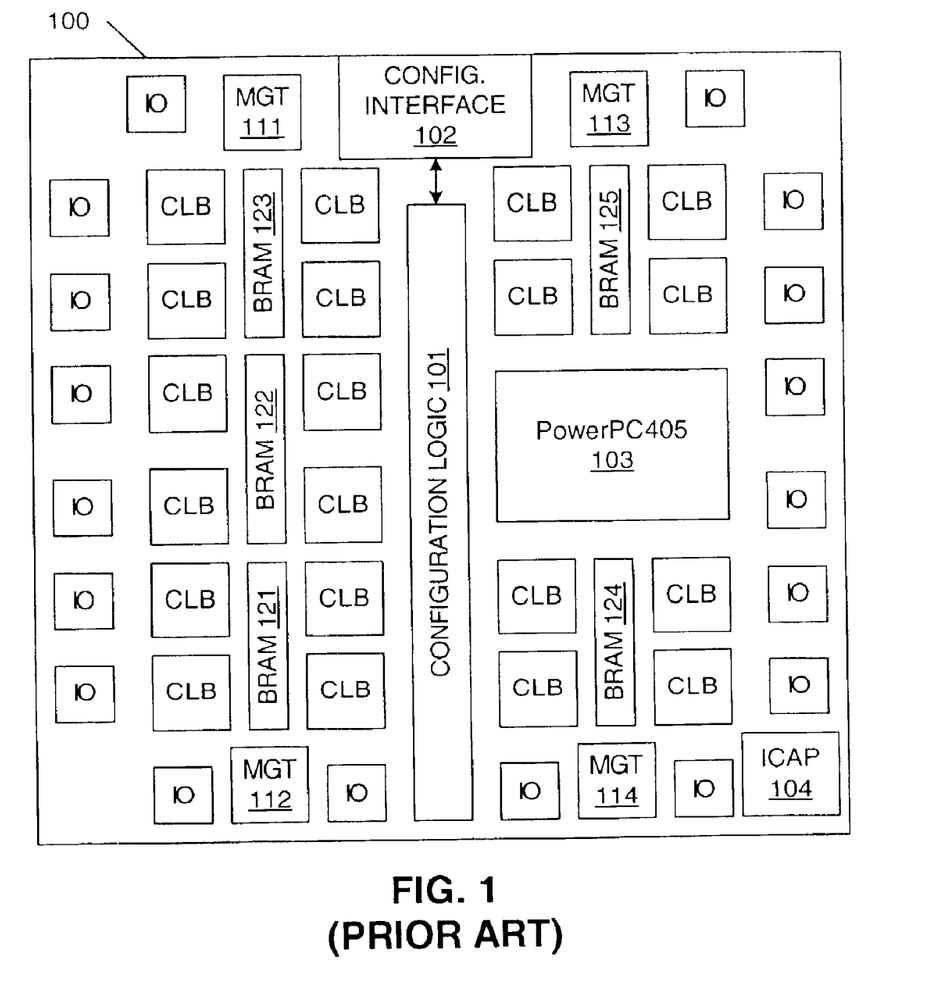
FIG. 1 is a block diagram of a conventional FPGA.

FIG. 1 is a block diagram of a conventional FPGA 100, which includes input/output (I/O) blocks (each labeled IO) located around the perimeter of the FPGA, multi-gigabit transceivers (MGT) 111–114 interspersed with the I/O blocks, configurable logic blocks (each labeled CLB) arranged in an array, block random access memory (BRAM) 121–125 interspersed with the CLBs, configuration logic 101, configuration interface 102, on-chip processor 103 and internal configuration access port (ICAP) 104. Although FIG. 1 shows a relatively small number of I/O blocks, CLBs and block RAMs for illustration purposes. It is understood that an FPGA typically includes many more of these elements. On-chip processor 103 is an IBM PowerPC 405 processor. FPGA 100 can include more than one of these processors (typically up to four of these processors). FPGA 100 also includes other elements, such as a programmable interconnect structure and a configuration memory array, which are not illustrated in FIG. 1. FPGA 100 is described in more detail in "Virtex-II™ Pro, Platform FPGA Handbook", (Oct. 14, 2002) which includes "Virtex-II Pro™ Platform FPGA Documentation" (March 2002) "Advance Product Specification," "Rocket I/O Transceiver User Guide", "PPC 405 User Manual" and "PPC 405 Processor Block Manual" available from Xilinx, Inc., 2100 Logic Drive, San Jose, Calif. 95124.

In general, FPGA 100 is configured in response to a set of configuration data values, which are loaded into a configuration memory array of FPGA 100 (not shown), via configuration interface 102 and configuration logic 101. Configuration interface 102 can be, for example, a select map interface, a JTAG interface, or a master serial interface. The configuration data values are loaded into the configuration memory array one frame at a time. Typically, several frames are required to configure a single column of the configuration memory array. Each frame can include anywhere from about 2,000 to 20,000 configuration data values, depending on the size of FPGA 100.

In certain cases, it is desirable to reconfigure select portions of FPGA 100. That is, it is desirable to partially reconfigure FPGA 100. In the past, partial reconfiguration has been accomplished using the following methods.

In one method, FPGA 100 is configured by loading a first full set of configuration data values from a first memory, such as a programmable read only memory (PROM). To reconfigure FPGA 100, a second full set of configuration data values are subsequently loaded into FPGA from a second memory. The second full set of configuration data values is substantially identical to the first full set of configuration data values, with the exception of the configuration data values required to modify the behavior of the targeted portion of FPGA 100.

The above-described scheme has several shortcomings. First, it is inefficient to store the configuration data values in two separate external memories, especially if the configuration data values stored by these separate memories are practically identical (the only differences being in the configuration data bits required to incrementally change the function of FPGA 100). In addition, there must be logic for selecting which of the two external memories will be used to configure or reconfigure FPGA 100. Moreover, the two separate external memories only provide for one partial reconfiguration option, thereby limiting the flexibility of the partial reconfiguration process. This scheme is also undesirably time consuming, because an entirely new full set of configuration data values must be loaded into FPGA 100 in order to reconfigure a small portion of the FPGA.

In another scheme, FPGA 100 is configured by loading a full set of configuration data values into the configuration memory array from an external memory. These configuration data values include one or more frames of reconfiguration data, which is loaded into one or more of block RAMs 121–125. For example, a first block RAM can be programmed to store a first frame of reconfiguration data, and a second block RAM can be programmed to store a second frame of reconfiguration data. The configuration data values also cause a plurality of configurable logic blocks to be configured to implement partial reconfiguration control logic. To implement partial reconfiguration, the partial reconfiguration control logic causes the desired frame or frames of reconfiguration data to be retrieved from the associated block RAM, and provided to internal configuration access port 104. In response, internal configuration access port 104 transmits each frame of reconfiguration data to configuration logic 101. In response, configuration logic 101 loads each frame of reconfiguration data into the configuration memory array, thereby overwriting previously loaded configuration data values. The interface between internal configuration access port 104 and configuration logic 101 is described in more detail in the Xilinx Libraries Guide available from Xilinx, Inc. at 2100 Logic Drive, San Jose, Calif. 95124.

The above-described scheme undesirably consumes excessive resources on FPGA 100. For example, storing frames of reconfiguration data in the block RAM undesirably consumes the block RAM resources of FPGA 100. In some cases, it may not be possible to store all of the desired frames of reconfiguration data in the available block RAM. Moreover, it is inefficient to store entire frames of reconfiguration data in the block RAM, because it is likely that each frame of reconfiguration data is substantially identical to the frame of configuration data being overwritten. That is, only a small number of bits in each frame of reconfiguration data are different than the bits in each frame of configuration data values being overwritten.

Accordingly, it would be desirable to have an improved scheme for implementing the partial reconfiguration of FPGA 100, which overcomes the above-described deficiencies.

SUMMARY

Accordingly, the present invention provides a method of partially reconfiguring a programmable logic device that includes the steps of (1) loading a base set of configuration data values into a configuration memory array of the programmable logic device, thereby configuring the programmable logic device; (2) reading a first frame of configuration data values from the configuration memory array; (3) modifying a subset of the configuration data values in the first frame of configuration data values, thereby creating a first modified frame of configuration data values; and (4) overwriting the first frame of configuration data values in the configuration memory array with the first modified frame of configuration data values, thereby partially reconfiguring the programmable logic device. The steps of reading, modifying and overwriting are performed under the control of a processor located on the programmable logic device.

In one embodiment, the modified subset of configuration data values in the first modified frame are used to control the configuration of multi-gigabit transceivers of the programmable logic device. For example, the first modified frame of configuration data values can be used to adjust the pre-emphasis and/or differential voltage characteristics of the multi-gigabit transceivers.

The subset of the configuration data values in the first frame can be modified in response to a control signal generated external to the programmable logic device. For example, the control signal may identify the location of the programmable logic device on a serial back plane. Alternately, the control signal may be provided by a user performing diagnostic tests on the multi-gigabit transceivers.

In a particular embodiment, the processor can store a plurality of different subsets of configuration data values, wherein each of the subsets represents a different partial reconfiguration of the programmable logic device. Advantageously, only the configuration data values being modified need to be stored.

In accordance with another embodiment, a programmable logic device includes a configuration memory array having a plurality of frames for storing configuration data values, and a processor configured to implement a partial reconfiguration of the programmable logic device by reading a frame from the configuration memory array, modifying only a select subset of the frame, thereby creating a modified frame, and writing the modified frame back to the configuration memory array. In one embodiment, the processor controls an internal configuration access port coupled between the processor and the configuration memory array, wherein the internal configuration access port retrieves the frame from the configuration memory array under control of the processor. One or more block RAMs can be used as a data-side on-chip memory, which stores the frame and modified frame. CLB resources of the programmable logic device can be used to implement a direct memory access (DMA) engine coupled between the data-side on-chip memory and the internal configuration access port. CLB resources can also be used to implement a device control register coupled to the DMA engine and the processor, wherein the processor controls the DMA engine via the register.

In yet another embodiment, the programmable logic device can be configured to implement a processor local bus coupled to the processor, and control logic coupled between the processor local bus and the internal configuration access port. The block RAM can also be coupled to the processor local bus. A communications interface coupled to the processor local bus can receive internal or external configuration control stimulus.

The present invention will be more full understood in view of the following description and drawings.

DETAILED DESCRIPTION

In accordance with the described embodiments of the present invention, a programmable logic device having an on-chip processor is configured to implement an efficient partial reconfiguration scheme. In the described embodiments, a conventional Virtex-II™ Pro FPGA, available from Xilinx, Inc., is used to implement the partial reconfiguration scheme. Thus, the present invention is described in connection with the use of FPGA 100 (FIG. 1). Although the present invention is described in connection with the partial reconfiguration of FPGAs, it is understood that the partial reconfiguration scheme of the present invention may also be implemented using other programmable logic devices.

The partial reconfiguration scheme is described in connection with the partial reconfiguration of the multi-gigabit transceivers (MGTs) 111–114 of FPGA 100. However, it is understood that other elements of FPGA 100 can be partially reconfigured in accordance with the principles described below.

In the described embodiment, MGTs 111–114 are reconfigured in order to optimize the operation of these transceivers. In general, MGTs 111–114 transmit differential signals to another chip at rates up to 3.125 Gigabits per second (Gbps). The length of the traces used to transmit these differential signals can vary, depending on the physical locations of the FPGA and the receiving chip. For example, FPGA 100 may be located on a printed circuit board that is plugged into a slot of a serial back plane. In this case, the length of the traces between FPGA 100 and the receiving chip is determined by the particular slot into which the FPGA has been inserted.

MGTs 111–114 can be configured to provide different levels of pre-emphasis to the transmitted differential signals. In the present embodiment, two configuration memory cells in each MGT are used to select one of four levels of signal pre-emphasis. More specifically, two "pre-emphasis" configuration memory cells in each MGT can be set to have a value of "00" in order to provide 10 percent pre-emphasis to the differential transmit signals. Similarly, these two pre-emphasis configuration memory cells can be set to have values of "01", "10" or "11" to provide 20 percent, 25 percent or 33 percent pre-emphasis, respectively, to the differential transmit signals.

MGTs 111–114 can also be configured to provide different differential output voltages. In the present embodiment, three configuration memory cells in each MGT are used to select one of five differential output voltages. More specifically, three "differential output voltage" configuration memory cells in each MGT can be set to have a value of "001" in order to provide an output signal having a differential voltage of 400 mV. Similarly, these three differential output voltage configuration memory cells can be set to have values of "010", "011", "100" or "101" to provide output signals having differential voltages of 500 mV, 600 mV, 700 mV or 800 mV, respectively.

In the described embodiments, the pre-emphasis and differential output voltage configuration memory cells for each MGT are located in the same frame of the configuration memory array. Thus, the pre-emphasis and differential output voltage configuration memory cells for MGTs 111, 112, 113 and 114 are located in four corresponding frames Frame_1, Frame_2, Frame_3 and Frame_4 of the configuration memory array.

In general, the present invention operates as follows. FPGA 100 is initially configured in response to a base set of configuration data values, which are provided by an external memory. In addition to configuring the rest of FPGA 100, this base set of configuration data values configures MGTs 111–114 in a predetermined base configuration. For example, in the base configuration, the pre-emphasis configuration memory cells may be loaded with a value of "00", and the differential output voltage configuration memory cells may be loaded with a value of "001".

A port identification signal (PORT_ID), which is a static 4-bit code provided on pins of FPGA 100, identifies the location of the FPGA in the serial back plane. Thus, the port identification signal is representative of the length of the transmission channel between the FPGA and a receiving chip. The port identification signal is provided to processor 103 on FPGA 100. Processor 103 is programmed to store different sets of pre-emphasis and differential output voltage configuration data values, wherein each set corresponds with a different port identification signal. Upon receiving the port identification signal, processor 103 accesses a corresponding set of pre-emphasis and differential output voltage configuration data values. Processor 103 also causes a frame of configuration data values, which includes the pre-emphasis and differential output voltage configuration data values for one of MGTs 111–114, to be read from the configuration memory array. Processor 103 then modifies the retrieved frame of configuration data values by overwriting the original pre-emphasis and differential output voltage configuration data values with the set of pre-emphasis and differential voltage configuration data values associated with the port identification signal. Processor 103 then causes the modified frame of configuration data values to be written back to the configuration memory array, thereby modifying the properties of the associated MGT. The above-described read-modify-write process is then repeated for the other MGTs on FPGA 100.

Although the present embodiment describes the modification of the MGTs in response to the port identification number, it is understood that the MGTs can also be tuned for other reasons, including characterization, changing system environments and diagnostics.

The manner in which FPGA 100 is used to implement the read-modify-write process for partially reconfiguring the MGTs will now be described in more detail.

Figure 2:
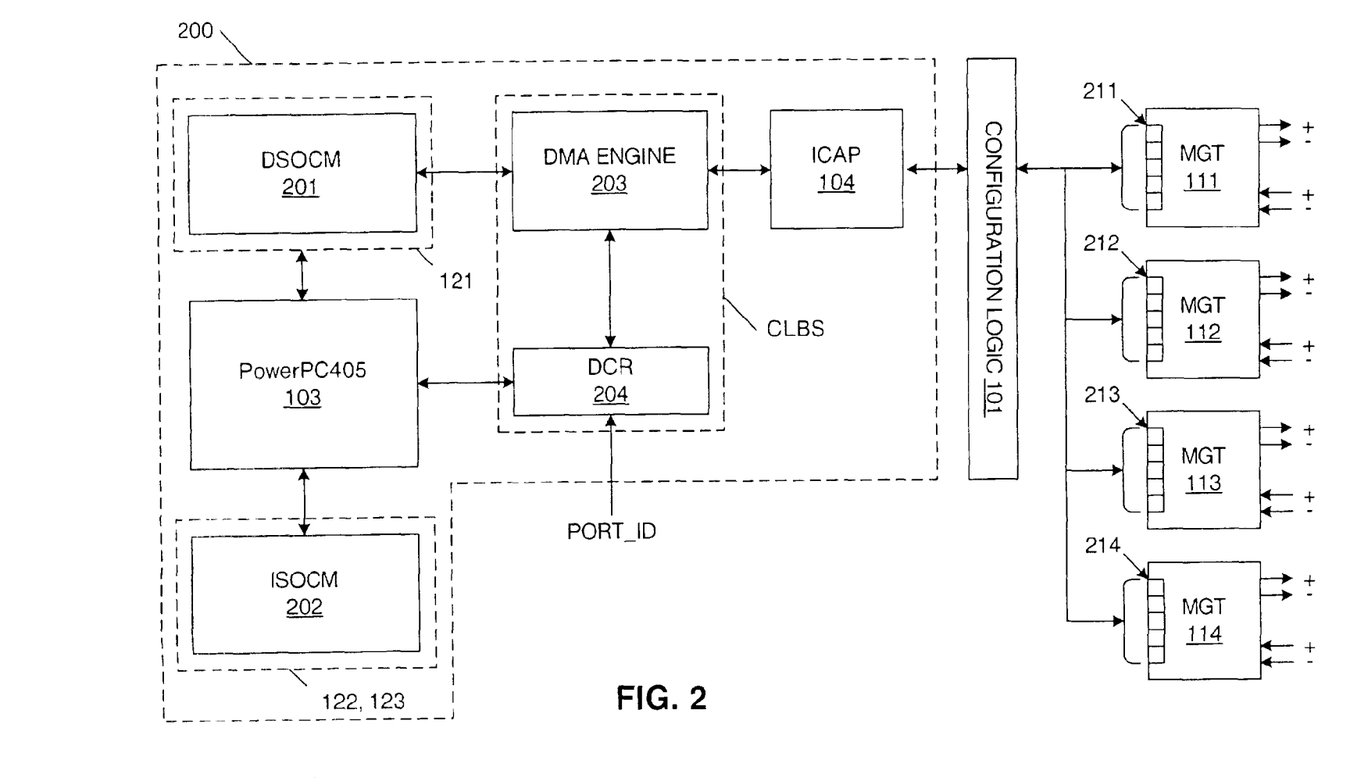
FIG. 2 is a block diagram of an internal configuration access port control module in accordance with one embodiment of the present invention.

FIG. 2 is a block diagram of an internal configuration access port (ICAP) control module 200 in accordance with one embodiment of the present invention. ICAP control module 200 enables MGTs 111–114 to be reconfigured using a read-modify-write scheme. Each of MGTs 111–114 includes a corresponding set of 5 configuration memory cells 211–214, which control the pre-emphasis and differential output voltage settings of the MGT.

ICAP control module 200 is configured using various elements of FPGA 100 (FIG. 1). Thus, ICAP control module 200 includes processor 103 and internal configuration access port 104. Internal configuration access port 104, which is a hardwired module found in every Virtex-II™ and Virtex-II™ Pro FPGA, has an interface similar to communications interface 102 (FIG. 1). Configuration logic 101 is coupled between ICAP 104 and the configuration memory cells 211–214 of the configuration memory array. The ports of internal configuration access port 104 are accessible to the user logic of FPGA 100 via the general interconnect. ICAP control module 200 also includes a data side on-chip memory (DSOCM) 201, which is formed by a block RAM 121, and an instruction side on-chip memory (ISOCM) 202, which is formed by two block RAMs 122–123. As described in more detail below, data-side OCM 201 is used to store program data, configuration frame data, and bit stream commands for read-back and write operations. Instruction-side OCM 202 stores instruction code necessary to operate processor 103.

ICAP control module 200 also includes a direct memory access (DMA) engine 203 and a device control register (DCR) 204. These elements 203–204 are formed by CLBs, which are configured in response to the base set of configuration data values. As described in more detail below, commands are issued to DMA engine 203 through device control register 204. DMA engine 203 and device control register 204 use 2 percent or less of the programmable logic of FPGA 100.

Because only three block RAMs are used to implement ICAP control module 200, this module does not consume excessive block RAM resources of FPGA 100. Moreover, the only CLB resources consumed by ICAP control module 200 include those necessary to create DMA engine 203 and device control register 204. Thus, ICAP control module 200 consumes minimal programmable logic resources on FPGA 100.

Figure 3:
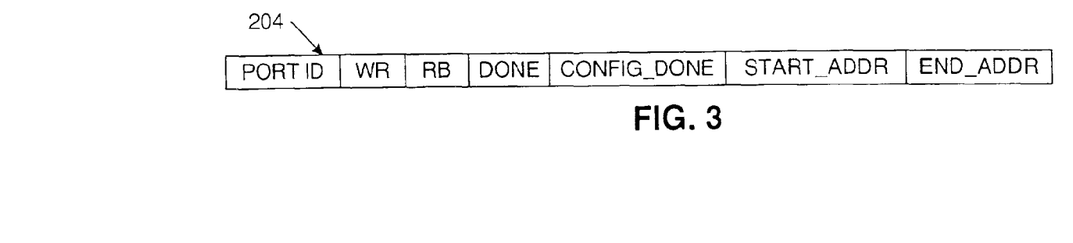
FIG. 3 is a block diagram of a device control register used in the internal configuration access port control module of FIG. 2, in accordance with one embodiment of the present invention.

FIG. 3 is a block diagram of device control register 204. Device control register 204 is a 32-bit register that stores a 4-bit port identification entry (PORT_ID), a 1-bit write enable entry (WR), a 1-bit read-back enable entry (RB), a 1-bit instruction done flag (DONE), a 1-bit reconfiguration done flag ((CONFIG_DONE)), an 11-bit start address (START_ADDR), an 11-bit end address (END_ADDR), and two unused bits (not shown).

Figure 4:
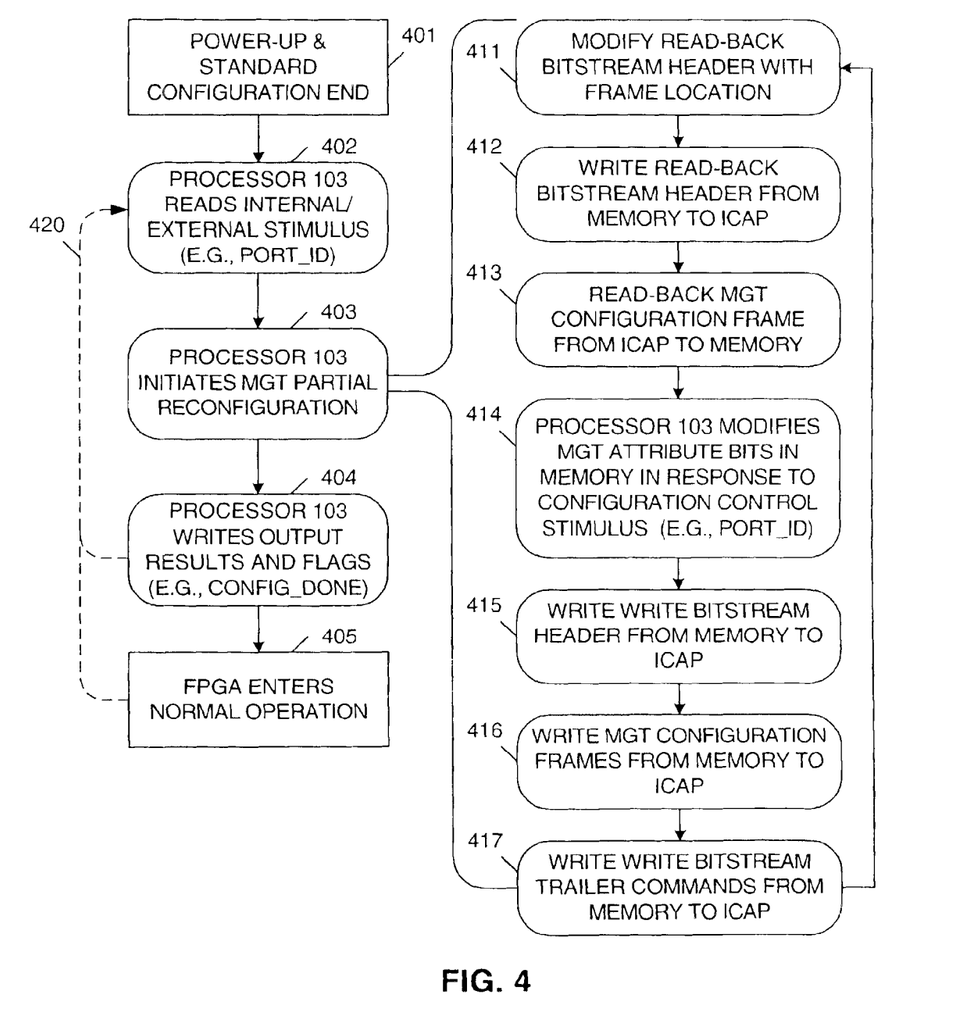
FIG. 4 is a flow diagram that defines the operation of an internal configuration access port control module, in accordance with one embodiment of the present invention.

FIG. 4 is a flow diagram that defines the operation of ICAP control module 200, in accordance with one embodiment of the present invention. As will become apparent in view of the following disclosure (FIG. 5), this flow diagram is equally applicable to other embodiments of present invention. Initially, FPGA 100 is powered-up, and standard configuration is performed by loading a base set of configuration data values in a manner that is known in the art (Step 401). An internal or external stimulus, such as the port identification value (PORT_ID) provided on the pins of FPGA 100, is loaded into the PORT_ID field of device control register 204. Processor 103 reads the PORT_ID from device control register 204 (Step 402). In response to the PORT_ID value read from device control register 204, processor 103 initiates the partial reconfiguration of MGTs 111–114 (Step 403). This partial reconfiguration is accomplished as follows.

First, processor 103 modifies a read-back bitstream header in data-side OCM 201 to identify an address of a frame (e.g., Frame_1) of the configuration memory array that includes the configuration data values for a subset of the MGTs (e.g., MGT 111) (Step 411). Then, processor 103 sets the write enable entry (WR) of device control register 204 to a logic "1" value, clears the done flag (DONE) and the reconfiguration done flag (CONFIG_DONE) in device control register 204, and sets the start and end addresses (START_ADDR and END_ADDR) in device control register 204. The start address ((START_ADDR)) is set to identify the address in data-side OCM 201 where the read-back bitstream header begins, and the end address (END_ADDR) is set to identify the address in data-side OCM 201 where the read-back bitstream header ends. Upon detecting the logic "1" write enable entry (WR) in device control register 204, DMA engine 203 routes the read-back bitstream header stored in data-side OCM 201 to internal configuration access port 104 (Step 412). DMA engine 203 then sets the DONE flag to a logic "1" state.

Internal configuration access port 104 initiates a configuration frame read-back operation in response to the received read-back bitstream header commands. As a result, a frame that includes the configuration data values 211 is retrieved from the configuration memory array, and provided to internal configuration access port 104.

In response to the logic "1" DONE flag, processor 103 resets the write enable entry (WR) to a logic low value, sets the read-back entry (RB) to a logic "1" value, resets the instruction done flag (DONE) to a logic "0" value, and sets the start and end addresses (START_ADDR and END_ADDR) in device control register 204. The start address and the end address (START_ADDR and END_ADDR) identify a block in data-side OCM 201 where the retrieved frame is to be written. Upon detecting the logic "1" read-back entry (RB) in device control register 204, DMA engine 203 routes the retrieved frame from internal configuration access port 104 to the location in data-side OCM 201 defined by START_ADDR and END_ADDR (Step 413). DMA engine 203 then sets the DONE flag to a logic "1" value.

Upon detecting the logic "1" DONE flag, processor 103 modifies select configuration bits (e.g., configuration bit set 211) stored in data-side OCM 201, by overwriting these configuration bits with new configuration bits. These new configuration bits are selected by processor 103 in response to the PORT_ID value retrieved from device control register 204 (Step 414). As described in more detail below, these new configuration bits can be selected in response to other internal or external configuration control stimulus in other embodiments. These new configuration bits define the new attributes of the associated MGT (e.g., MGT 111).

Processor 103 then resets the DONE flag to a logic "0" value, resets the read-back entry (RB) to a logic "0" value, and sets the write enable entry (WR) to a logic "1" value in device control register 204. Processor 103 also sets the start and end addresses (START_ADDR and END_ADDR) in device control register 204. The start address (START_ADDR) is set to identify the address in data-side OCM 201 where the write bitstream header begins, and the end address (END_ADDR) is set to identify the address in data-side OCM 201 where the write bitstream header ends. Upon detecting the logic "1" write enable entry (WR) in device control register 204, DMA engine 203 routes the write bitstream header stored in data-side OCM 201 to internal configuration access port 104, thereby initiating a write access to the configuration memory array (Step 415). DMA engine 203 then sets the DONE flag to a logic "1" state.

Upon detecting the logic "1" DONE flag, processor 103 resets the DONE flag to a logic "0" state, sets the write enable signal (WR) to a logic "1" value, and sets the start and end addresses (START_ADDR and END_ADDR) in device control register 204. The start address (START_ADDR) is set to identify the address in data-side OCM 201 where the modified frame begins, and the end address (END_ADDR) is set to identify the address in data-side OCM 201 where the modified frame ends. Upon detecting the logic "1" write enable entry (WR) in device control register 204, DMA engine 203 routes the modified frame stored in data-side OCM 201 to internal configuration access port 104. In response, internal configuration access port 104 writes the modified frame of configuration data values back to the configuration memory array, such that this modified frame of configuration data values overwrites the previously retrieved frame of configuration data values (Step 416). As a result, the modified configuration bit set 211 modifies the configuration of MGT 111. DMA engine 203 then sets the DONE flag to a logic "1" value.

Upon detecting the logic "1" DONE flag, processor 103 resets the DONE flag to a logic "0" state, sets the write enable signal (WR) to a logic "1" value, and sets the start and end addresses (START_ADDR and END_ADDR) in device control register 204. The start address (START_ADDR) is set to identify the address in data-side OCM 201 where the write bitstream trailer begins, and the end address (END_ADDR) is set to identify the address in data-side OCM 201 where the write bitstream trailer ends. Upon detecting the logic "1" write enable entry (WR) in device control register 204, DMA engine 203 transfers the write bitstream trailer stored in data-side OCM 201 to internal configuration access port 104, thereby instructing internal configuration access port 104 to complete the write access to the configuration memory array (Step 417). DMA engine 203 then sets the DONE flag to a logic "1" value, and processing returns to Step 411. Steps 411–417 are then repeated until all of the frames storing configuration data values for the MGTs have been read, modified and written in the foregoing manner. In the described example, all of the configuration bit sets 211–214 will be modified after the four cycles through Steps 411–417. At this time, processor 103 writes the output results and sets the appropriate flags. (Step 404). In the present example, processor 103 sets the reconfiguration done flag (CONFIG_DONE) in device control register 204 to a logic "1" value, thereby indicating that all of the MGTs have been properly reconfigured. At this time, FPGA 100 begins normal operation (Step 405).

Advantageously, the above-described embodiment only requires that five configuration bits be stored in data-side OCM 201 for each possible port identification value ((PORT_ID)). This greatly reduces the required storage capacity for the partial reconfiguration operation, when compared with the prior art schemes. Moreover, the above-described embodiment does not consume excessive logic resources of the FPGA 100, but rather uses the existing internal configuration access port 104 and processor 103. Finally, the above-described embodiment provides a scheme that can be easily implemented by users with little or no processor/programming experience. Another embodiment, described below, may be desired by users having processor/programming expertise.

Figure 5:
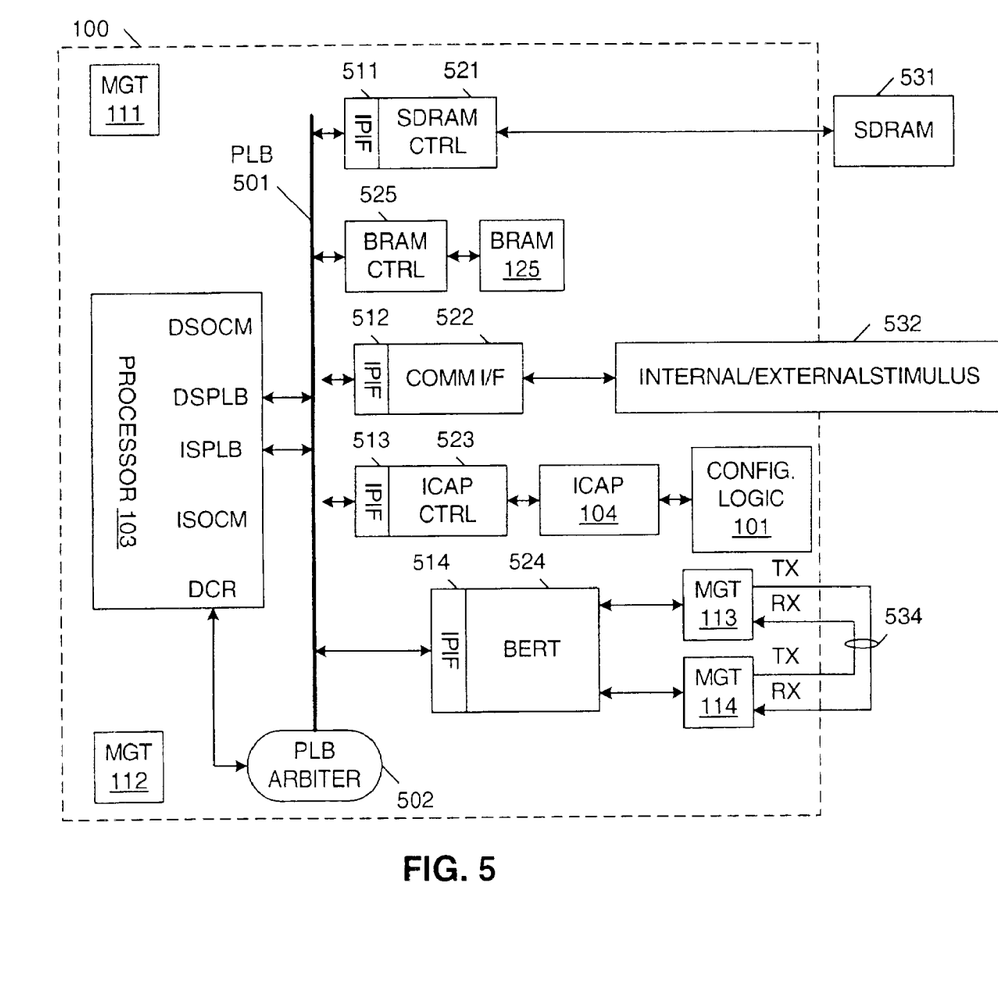
FIG. 5 is a block diagram of an FPGA, which is configured to implement partial reconfiguration in accordance with another embodiment of the present invention.

FIG. 5 is a block diagram of FPGA 100, configured in accordance with another embodiment of the present invention. In this embodiment, FPGA 100 is configured to implement a processor local bus (PLB) 501, which is coupled to processor 103. Access to PLB 501 is controlled by a dedicated PLB arbiter 502, which is coupled to processor 103. Implementation of PLB 501 and PLB arbiter 502 with processor 103 is known to those of ordinary skill in the art, and is described in more detail in the Virtex-II™ Pro Platform FPGA Developer's Kit, available from Xilinx, Inc.

Intellectual property interface (IPIF) blocks 511–514 are used to enable various controllers to be coupled to PLB 501. IPIF blocks 511–514 are described in more detail in the Virtex-II™ Pro Platform FPGA Developer's Kit.

IPIF block 511 is used to couple synchronous dynamic random access memory (SDRAM) controller 521 to PLB 501. SDRAM controller 521, which is implemented by configuring CLBs on FPGA 100, is coupled to an external SDRAM 531. As described in more detail below, external SDRAM 531 can be used to store header, trailer and reconfiguration data in the same manner as block RAM 125.

IPIF block 512 is used to couple communications interface 522 to PLB 501. Communications interface 522, which is implemented by CLBs in the described embodiment, is coupled to receive an internal or external stimulus 532. As described in more detail below internal/external stimulus 532 is used to provide information indicating the manner in which MGTs 111–114 are to be configured.

IPIF block 513 is used to couple ICAP controller 523 to PLB 501. ICAP controller 523, which is implemented by CLBs in the described embodiment, is coupled to ICAP 104. ICAP 104 is coupled to configuration logic 101, which in turn, is coupled to the configuration memory array.

IPIF block 514 is used to couple bit error rate tester (BERT) 524 to PLB 501. BERT 524 is coupled to MGTs 113 and 114 in accordance with one variation of the present invention. In this embodiment, MGT 113 transmits a predetermined set of signals to MGT 114 via a communications channel 534. Similarly, MGT 114 transmits a predetermined set of signals to MGT 113 via communications channel 534.

Block RAM controller 525, which is implemented by CLBs in the described embodiment, is coupled to block RAM 125.

FPGA 100 of FIG. 5 can be operated as follows. FPGA 100 is initially configured in response to a base set of configuration data values, which are provided by an external memory (not shown). This configuration implements PLB 501 and the associated logic illustrated in FIG. 5. In addition to configuring the rest of FPGA 100, this base set of configuration data values configures MGTs 111–114 in a predetermined base configuration.

MGTs 111–114 can be reconfigured as follows. Internal/external stimulus 532 provides a reconfiguration instruction/value to communication interface 522. In one embodiment, the internal/external stimulus 532 can be a port identification value (PORT_ID) provided on pins of FPGA 100, in the manner described above in connection with FIG. 2. Internal/external stimulus 532 can be implemented by external devices, such as a terminal program, a network connection, a host shell, or switches. Alternatively, internal/external stimulus 532 can be implemented by internal devices, such as processor controlled sequential events, or decision and control based upon a response to an on-chip event or test. Communication interface 522, which receives the reconfiguration instruction/value, can be, for example, a universal asynchronous receiver/transmitter (UART).

Communication interface 522 routes the reconfiguration instruction to IPIF 512. Under the control of PLB arbiter 502, IPIF 512 routes the reconfiguration instruction to processor 103 via PLB 501. In response to the reconfiguration instruction provided by internal/external stimulus 532, processor 103 initiates the partial reconfiguration of MGTs 111–114. This partial reconfiguration is accomplished as follows.

First, processor 103 modifies a read-back bitstream header, which is stored in either external SDRAM 531 or block RAM 125, to identify an address of a frame (e.g., Frame_1) in the configuration memory array that includes the configuration data values for one of MGTs 111–114 (e.g., MGT 111). Processor 103 accesses SDRAM 531 (or block RAM 125) via PLB 501. Processor 103 then causes the read-back bitstream header stored in SDRAM 531 or block RAM 125 to be retrieved and routed to internal configuration access port 104 (via PLB 501).

Internal configuration access port 104 initiates a configuration frame read-back operation in response to the received read-back bitstream header commands. As a result, the frame (Frame_1) that includes the configuration data values 211 of MGT 111 is retrieved from the configuration memory array, and provided to internal configuration access port 104.

Processor 103 routes the retrieved frame from internal configuration access port 104 to external SDRAM 531 or block RAM 125 (via PLB 501). Processor 103 then modifies select configuration bits (e.g., configuration bit set 211) stored in external SDRAM 531 or block RAM 125, by overwriting these configuration bits with new configuration bits. These new configuration bits are selected by processor 103 in response to the reconfiguration instruction received from internal/external stimulus 532. These new configuration bits define the new attributes of the associated MGT 111.

Processor 103 then routes a write bitstream header stored in external SDRAM 531 or block RAM 125 to internal configuration access port 104 (via PLB 501), thereby initiating a write access to the configuration memory array. Processor 103 then routes the modified frame stored in external SDRAM 531 or block RAM 125 to internal configuration access port 104 (again, via PLB 501). In response, internal configuration access port 104 writes the modified frame of configuration data values back to the configuration memory array, such that this modified frame of configuration data values overwrites the previously retrieved frame of configuration data values. As a result, the modified configuration bit set 211 modifies the configuration of MGT 111. Processor 103 then transfers a write bitstream trailer stored in external SDRAM 531 or block RAM 125 to internal configuration access port 104 (via PLB 501), thereby instructing internal configuration access port 104 to complete the write access to the configuration memory array. This process is repeated until all of the frames storing configuration data values for the MGTs have been read, modified and written in the foregoing manner. FPGA 100 can then begin normal operation.

In one embodiment, BERT 524 can be used to enable adaptive modification of the characteristics of MGTs 111–114. In this embodiment, MGTs 111–114 are configured to a predetermined base configuration in the manner described above. Processor 103 then instructs BERT 524 (via PLB 501) to run a bit error rate test in the following manner. BERT 524 transmits a first set of predetermined differential signals from the transmit port of MGT 113 to the receive port of MGT 114, over a communications channel 534. Similarly, BERT 524 transmits a second set of predetermined differential signals (which may be identical to the first set) from the transmit port of MGT 114 to the receive port of MGT 113, over communications channel 534. MGTs 113 and 114 provide the received signals to BERT 524, which determines the bit error rate of communications channel 534. Communications channel 534 is representative of the communications channel to be used by MGTs 111–114 during normal operation.

BERT 524 reports the determined bit error rate to processor 103. If this bit error rate is unacceptable, processor 103 can reconfigure MGTs 111–114 in the manner described above, and then re-test the bit error rate. This process can be repeated until an optimal configuration is determined for MGTs 111–114.

An adaptive loop, such as the one described above, is illustrated by dashed line 420 in FIG. 4. This dashed line 420 indicates that after the partial reconfiguration is completed in Step 404 or Step 405, processing may return to Step 402, where processor 103 reads the internal/external stimulus (which has been modified in response to the partial reconfiguration), and in response, proceeds with another partial reconfiguration.

Figure 6:
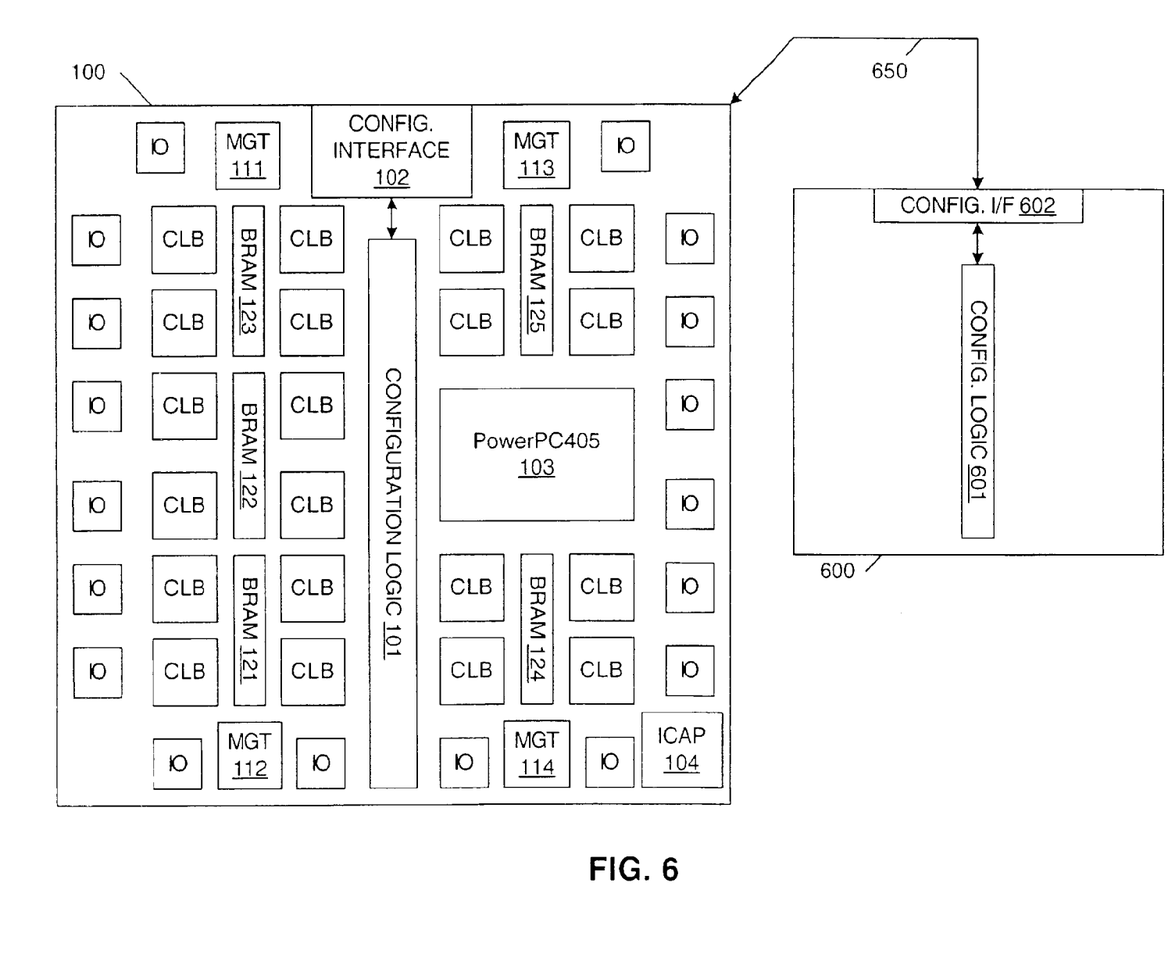
FIG. 6 is a block diagram illustrating an embodiment in which the FPGA of FIG. 2 or 5 is used to implement partial reconfiguration of another FPGA.

In accordance with one embodiment of the present invention, FPGA 100 can be used to control the partial reconfiguration of another FPGA, which may or may not include an associated processor. FIG. 6 is a block diagram illustrating an embodiment in which FPGA 100 is used to implement partial reconfiguration of another FPGA 600. FPGA 600, which includes configuration logic 601 and configuration interface 602, may or may not include a processor. In this embodiment, FPGA 100 is configured in the manner described above in connection with either FIG. 2 or FIG. 5. A communications channel 650 is provided between FPGA 100 and FPGA 600. Communications channel 650 links either DMA engine 203 (FIG. 2) or the processor local bus 501 (FIG. 5) of FPGA 100 with a configuration interface 602 of FPGA 600. Configuration interface 602 is substantially similar to configuration interface 102 of FPGA 100. In one embodiment, configuration interface 602 is substantially identical to internal configuration access port 104, with the difference being that internal configuration access port 104 is accessed via user logic, and configuration interface 602 is accessed via external logic.

FPGA 100 operates in the manner described above to read a frame from the configuration memory array of FPGA 600 (via communications channel 650, configuration interface 602 and configuration logic 601). FPGA 100 then modifies the frame retrieved from FPGA 600 by overwriting select configuration bits of the frame in the manner described above. Note that the frame is modified using the resources of FPGA 100. FPGA 100 then writes the modified frame back to FPGA 600 (via communications channel 650, configuration interface 602 and configuration logic 601). Advantageously, this embodiment enables the resources of one FPGA (e.g., FPGA 100) to be used to partially reconfigure one or more other FPGAs (e.g., FPGA 600).

Although the invention has been described in connection with several embodiments, it is understood that this invention is not limited to the embodiments disclosed, but is capable of various modifications, which would be apparent to one of ordinary skill in the art. For example, although only one processor is shown on FPGA 100, it is understood that more than one processor may be present in other embodiments. Thus, the invention is limited only by the following claims.

We claim:

1. A programmable logic device comprising:
   a configuration memory array having a plurality of frames, wherein the configuration memory array stores configuration data values for controlling the configuration of the programmable logic device;
   a processor configured to implement a partial reconfiguration of the programmable logic device by reading a frame from the configuration memory array, modifying only a select subset of the frame, thereby creating a modified frame, and writing the modified frame back to the configuration memory array; and
   wherein the frame is transferred to the processor without propagating through an input/output interface to an external device.

2. The programmable logic device of claim 1 further comprising an internal configuration access port (ICAP) coupled between the processor and the configuration memory array, wherein the ICAP retrieves the frame from the configuration memory array under control of the processor.

3. The programmable logic device of claim 2, further comprising a first memory coupled to the processor and the ICAP, wherein the first memory stores the frame and modified frame.

4. The programmable logic device of claim 3, wherein the first memory comprises block random access memory (BRAM) resources of the programmable logic device.

5. The programmable logic device of claim 3, further comprising a direct memory access (DMA) engine coupled between the first memory and the ICAP.

6. The programmable logic device of claim 5, further comprising a register coupled to the DMA engine and the processor, wherein the processor controls the DMA engine via the register.

7. The programmable logic device of claim 2, further comprising: a processor local bus coupled to the processor; and
   control logic coupled between the processor local bus and the ICAP.

8. The programmable logic device of claim 7, further comprising a memory block coupled to the processor local bus, wherein the memory block stores the frame and modified frame.

9. The programmable logic device of claim 7, further comprising a communications interface coupled to the processor local bus, wherein the communications interface provides an interface for an internal or external stimulus.

10. A programmable logic device comprising:
    a configuration memory array configured to store frames of configuration data values that define the configuration of the programmable logic device;
    means for reading a first frame from the configuration memory array without the first frame propagating through an IOB or a JTAG circuit;
    means for modifying a subset of the configuration data values in the first frame, thereby creating a first modified frame; and
    means for overwriting the first frame of the configuration memory array with the first modified frame, thereby partially reconfiguring the programmable logic device.

11. A method of partially reconfiguring a programmable logic device, the method comprising:
    loading a base set of configuration data values into a configuration memory array of the programmable logic device, thereby configuring the programmable logic device;
    reading a first frame of configuration data values from the configuration memory array, without the first frame propagating through an IOB or a JTAG circuit;
    modifying a subset of the configuration data values in the first frame of configuration data values using a microprocessor located in the programmable logic device, thereby creating a first modified frame of configuration data values; and
    overwriting the first frame of configuration data values in the configuration memory array with the first modified frame of configuration data values, thereby partially reconfiguring the programmable logic device.

12. The method of claim 11, wherein the modified subset of the configuration data values in the first frame control the configuration of multi-gigabit transceivers of the programmable logic device.

13. The method of claim 11, wherein the first modified frame of configuration data values adjust the pre-emphasis and differential voltage characteristics of the multi-gigabit transceivers.

14. The method of claim 11, further comprising modifying the subset of the configuration data values in the first frame in response to a control signal generated external to the programmable logic device.

15. The method of claim 14, wherein the control signal identifies a location of the programmable logic device on a serial back plane.

16. The method of claim 14, wherein the control signal is received from a source external to the programmable logic device.

17. The method of claim 14, further comprising storing a plurality of subsets of configuration data values on the programmable logic device, wherein each of the subsets of configuration data values partially reconfigures the programmable logic device in a different manner.

18. The method of claim 11, wherein the steps of reading, modifying and overwriting are performed under the control of a processor located on the programmable logic device.

19. The method of claim 11, further comprising:

monitoring the operation of the programmable logic device after the programmable logic device has been partially reconfigured in response to the first modified frame of configuration data values; and then reading the first modified frame of configuration data values from the configuration memory array;

modifying a subset of the configuration data values in the first modified frame of configuration data values, thereby creating a second modified frame of configuration data values; and overwriting the first modified frame of configuration data values in the configuration memory array with the second modified frame of configuration data values, thereby partially reconfiguring the programmable logic device.

* * * * *